United States Patent Office 3,006,976
Patented Oct. 31, 1961

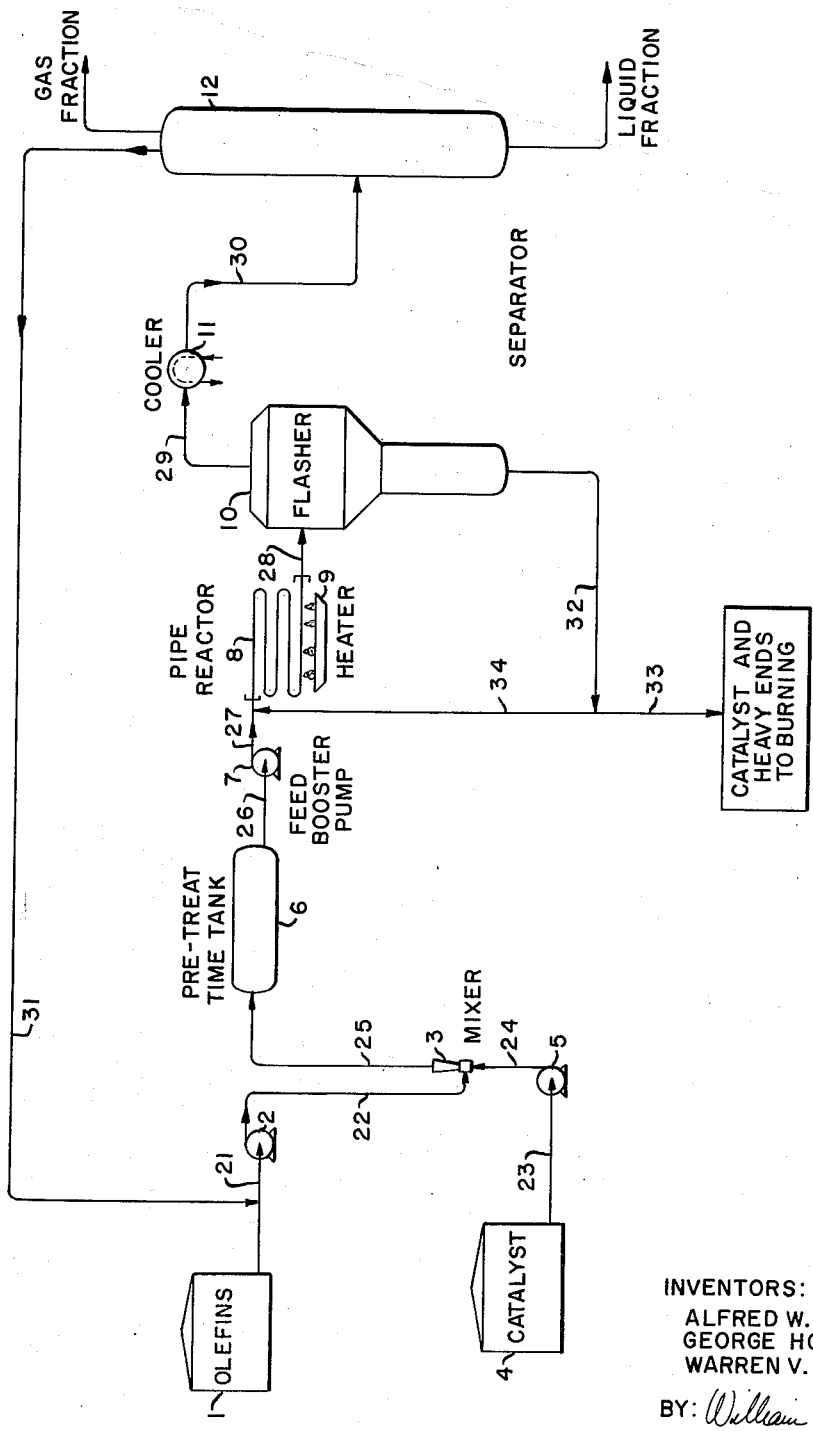

3,006,976
CONDENSATIONS OF ALKYL AROMATICS AND OLEFINS
Alfred W. Shaw, Moraga, and George Holzman and Warren V. Bush, Walnut Creek, Calif., assignors to Shell Oil Company, New York, N.Y., a corporation of Delaware
Filed Apr. 4, 1960, Ser. No. 19,948
12 Claims. (Cl. 260—671)

This invention relates to an improvement in chemical reactions in which metalated compounds act as reaction intermediates. More specifically, it relates to the use of improved alkali metal catalysts in such reactions.

It is known that it is a peculiar characteristic of the alkali metals that they can form addition compounds with organic compounds containing carbon-carbon, carbon-nitrogen, or carbon-oxygen double bonds. A number of such metalated compounds have been isolated. Organic alkali metal addition compounds are particularly useful as reaction intermediates. A number of chemical reactions are known in which a compound capable of forming a metalated product by reaction with an alkali metal is condensed with another compound in a reaction in which an alkali metal acts as catalyst for the condensation. It is generally believed that the mechanism of these reactions involves the formation of the metalated intermediates of the first-mentioned compound, followed by reaction thereof with the second-mentioned compound. The metalated compounds need not be preformed or isolated in these reactions.

A reaction which is typical of the alkali metal-catalyzed reactions referred to is the alkylation of alkyl side chains of aromatic hydrocarbons by means of nonconjugated olefins. This reaction was first described in U.S. Patent 2,448,641 to Whitman. Whitman's reaction required temperatures of 150° to 450° C., pressures of 50 to 3,000 atmospheres and reaction times of 10 to 17 hours. It was thereafter found by Little, U.S. 2,548,803, that the same reaction could be carried out at pressures of 100 to 3,000 atmospheres but at lower temperatures of 0° to 130° C. when using as catalyst a preformed organo-alkali metal compound such as an alkali metal alkyl or an alkali metal aryl. These reactions required 16 hours contact time. An improvement over these reactions is disclosed by Closson et al. in U.S. 2,728,802. The catalysts were organo-alkali metal compounds of the same type. It was found that the reaction could be carried out at temperatures of 0° to 350° C. and pressures below 90 atmospheres. The reaction times in the illustrative examples were from 1.75 to 4.5 hours. The alkali metal-catalyzed alkylation of side chains of aromatic compounds was improved by Pines et al. by utilizing a variety of reaction promoters, disclosed in U.S. Patents 2,670,390, 2,688,044, 2,721,885, 2,721,886 and 2,748,178. The promoted reactions of Pines et al. are carried out at temperatures between 100° and 350° C., pressures between 5 and 50 atmospheres, and at disclosed reaction times of from 2.8 to 7 hours, most examples utilizing 4 to 5 hours.

Other typical alkali metal-catalyzed reactions are known. The alkylation of side chains of heterocyclic compounds having a nitrogen atom in a six-membered ring is shown in U.S. 2,750,384 to Closson et al. The intercondensation of olefins is shown in U.S. 2,466,694 to Freed. The alkylation of isoparaffins is disclosed in U.S. 2,834,818 to Schmerling et al.

All of these reactions are characterized in that two molecules interact, in the presence of the catalyst, to form a new compound. One of the reactant molecules must contain a double bond. The other mocecule must have a relatively active hydrogen atom. It is preferable that the activity of this hydrogen be at least about equivalent to that of a hydrogen attached to a carbon which is alpha to a ring carbon atom in an aromatic ring. However, under some conditions hydrogens as weak as the tertiary hydrogens of isoparaffins may react. The activity of hydrogen atoms may be expressed on the well-known pK scale. The pK of the methyl group hydrogens of toluene is about 37, that of the allylic hydrogens of propylene is estimated to be about 36.5. The hydrogens in ammonia and the bridge hydrogens in diphenylmethane are 35. Compounds having hydrogens whose pK is 37 or lower react most readily in these processes. Those whose pK is between 37 and 40 or higher may also react at suitably severe conditions.

The molecule having an active hydrogen atom is believed to interact with the alkali metal present to form a metalated intermediate which reacts with the molecule containing a double bond. This metalated intermediate may be relatively stable or very unstable. It is generally not isolated in the condensation reactions of this invention.

At suitably selected conditions, hydrogen atoms of an olefin are sufficiently active that the two interacting molecules can actually be molecules of a single olefinic compound.

It is an object of this invention to provide improved alkali metal-containing catalysts for use in chemical reactions in which metalated compounds act as reaction intermediates. Another object is to provide an improvement in the alkali metal-catalyzed condensation of compounds containing an active hydrogen atom with organic compounds containing an unsaturated linkage. It is a further object to provide alkali metal catalysts which are more reactive than any catalyst hitherto used in such reactions.

It is a specific object to provide improvements in processes for the alkylation of a saturated carbon atom attached to a nuclear carbon atom of an aromatic or heterocyclic or alicyclic ring which latter carbon atom is in turn attached by a double bond to another ring carbon atom.

It is a further object to provide a novel process for the dimerization of propylene. It is a specific object to provide a process for the production of 4-methyl-1-pentene.

Another object is to provide an improved process for the copolymerization of olefins to produce a large proportion of alpha-olefins.

The drawing illustrates a preferred set of apparatus for carrying out the process of the invention.

It has now been found that organic reactions in which an alkali metal acts as catalyst by forming an intermediate with a compound having an active hydrogen atom can be completed in a few minutes instead of hours by employing a combination of alkali metals containing at least two alkali metals from nonsuccessive periods of group I of the periodic table, as arranged by Mendeleeff.

While pairs of alkali metals from non-adjacent periods provide remarkably accelerated rates of reaction and preferred types of conversions, in many instances still better results are obtained by the use of ternary mixtures or even quaternary mixtures of alkali metals as long as at least two of them are from non-adjacent periods. Particularly preferred combinations include lithium with sodium and potassium; lithium with sodium and cesium; cesium with lithium and sodium and combinations of lithium, sodium, potassium and cesium. It is particularly preferred to employ combinations which are liquid at relatively low temperatures, that is,, at temperatures below the temperature at which carbanion reactions commence. Such liquid mixtures of the catalysts simplify processing procedures and enable ready release of the alloys from any surface oxides which may be present. Suitable proportions for example include sodium-potassium combinations having approximately 25–85 atom percent potassium (36–91 weight percent potassium) since these are liquids at room temperature.

The arrangement of the alkali metals in group I of the periodic table is as follows:

| Element | Atomic number | Period | Arrangements of electrons in shells | | | | | |
|---|---|---|---|---|---|---|---|---|
| | | | K | L | M | N | O | P |
| Lithium | 3 | 1 | 2 | 1 | | | | |
| Sodium | 11 | 2 | 2 | 8 | 1 | | | |
| Potassium | 19 | 3 | 2 | 8 | 8 | 1 | | |
| Rubidium | 37 | 4 | 2 | 8 | 18 | 8 | 1 | |
| Cesium | 55 | 5 | 2 | 8 | 18 | 18 | 8 | 1 |

In some cases, the novel catalysts permit reactions to take place at conditions at which little or no reaction would take place with an unpromoted alkali metal.

Although no explanation can be offered at this time, it has also been found that the novel catalysts not only promote known reactions but can result in a profoundly different product distribution, compared to the use of known promoted catalysts. For example, the dimerization of propylene with a conventional catalyst results in a product whose $C_6$ fraction consists mainly of internal olefins and very little 4-methyl-1-pentene. On the other hand, the catalysts of this invention result in a product whose $C_6$ fraction consists mainly of 4-methyl-1-pentene. The latter product is a highly desirable monomer for the production of isotactic polymers and is not readily produced by known methods. The hexenes produced by use of the conventional catalyst are not attractive for the same purpose. It is interesting to note that the equilibrium mixture of hexene isomers at the temperatures employed contains less than one percent of 4-methyl-1-pentene.

No complete explanation can be offered for the outstanding activity of the combinations of alkali metals from nonsuccessive periods. It is possible, however, that the presence of uncompleted electron orbitals which is found in potassium, rubidium, and cesium and/or the lowered attraction for the valence electron in the latter elements causes each of them to coact with another alkali metal to produce an extremely active catalyst, and that such reactivity is enhanced by the substantial difference in atomic size between elements in nonsuccessive periods.

Some of the alkali metal combinations of this invention are more active than others. Particularly active and particularly preferred combinations of alkali metals, in decreasing order of preference, are potassium and cesium, lithium and potassium, and lithium and cesium. The combination of sodium and cesium, though more active than any single alkali metal, is somewhat less active than the other named combinations. Rubidium is a relatively rare metal and its combinations are, therefore, less preferred for economic reasons.

It was found that a mixture of lithium and sodium is no more active than either metal alone and is substantially less active than either cesium alone or potassium alone and that a mixture of sodium and potassium has an activity of the order of potassium alone, and substantially lower than cesium alone.

Thus, these mixtures of alkali metals from successive periods of the periodic table are not improved catalysts, compared to single alkali metals.

Surprisingly, it was found that among the suitable combinations even a small proportion of one of the metals when admixed with the other is sufficient to modify the activity of the catalyst in the desired manner. Thus when only 2 alkali metals from non-adjacent periods are employed, the catalyst may contain from 0.02 to 99 mole percent of one of the components, the difference being made up by the other; a concentration of between 10 and 50% of one of the components is generally preferred.

When ternary or quaternary mixtures of alkali metals are utilized, the alkali metal having either the lowest or highest atomic number in the mixture may be present in very small proportions and unaccountably provide maximum reaction rates, lower reaction temperatures and preferred types of conversions. For example, in ternary mixtures of alkali metals containing lithium as the third member of the ternary mixture, it may be present in amounts between about 0.02 and about 0.1 weight percent. When the proportion of the alkali metal having the lowest or highest number is restricted to within this percentage, it has been found that maximum beneficial results in the general class of catalyzed reactions described herewith are obtained. Specifically, preferred ternary systems comprise those in which the lithium is present in an amount between about 0.02 and 0.1 weight percent, the potassium is present in an amount between about 35 and 90 percent and sodium makes up the remainder. Since sodium is the cheapest of the alkali metals and lithium is the most expensive of this ternary combination, the greater percentage of sodium which may be utilized to obtain a desired result is preferred. The active catalyst mixture is preferably employed in amounts of from 0.01 to 0.20 mole of alkali metal per mole of the organic compound having an active hydrogen atom. A concentration of about 0.1 mole of alkali metal mixture per mole of said organic compound is particularly suitable.

The activity of the catalysts of this invention is sufficiently greater than that of single alkali metals, even when promoted with the conventional promoters referred to, that these catalysts will permit the polymerization of ethylene at a relatively rapid rate. Compounds whose most active hydrogen corresponds to the activity of ethylene, i.e., a pK of 38–40, can thus be condensed with a compound containing an unsaturated linkage according to the process of this invention.

In one aspect, the present invention relates to a method for forming a metalated organic compound by reacting a compound which contains an active hydrogen atom in the presence of an alkali metal combination containing at least two alkali metals selected from nonsuccessive periods of the periodic table.

In a preferred embodiment the present invention relates to a method for condensing a compound containing an active hydrogen atom with an organic compound containing an unsaturated linkage by reacting a mixture of said compounds with an alkali metal combination containing at least two alkali metals selected from non-successive periods of the periodic table, and preferably a pair selected from the group consisting of potassium and cesium, lithium and potassium, and lithium and cesium.

The compounds of the first class, characterized by an active hydrogen atom, which form metalated reaction intermediates and with which unsaturated organic compounds can be condensed according to the process of this invention, are selected from the following five groups:

(1) The first group consists of cyclic compounds having attached to a nuclear carbon atom, which is attached by a double bond to another nuclear carbon atom, a carbon of a hydrocarbyl group to which carbon atom is attached at least one hydrogen atom.

This group of compounds includes carbocyclic aromatic and hydroaromatic compounds and heterocyclic compounds. The carbocyclic compounds may have a benzene, naphthalene, etc. nucleus. The heterocyclic compounds may have a pyridine, furan, thiophene, pyrrole, pyrazole, etc. nucleus. The compounds may contain both a carbocyclic ring and a heterocyclic ring such as is found in indole and in carbazole. The compounds may also contain both a benzene nucleus and a cycloalkane nucleus such as is found in tetralin and in indan. The hydroaromatic compounds preferably contain nongeminally-substituted carbon atoms. The cyclic compounds preferred for use contain a saturated side chain attached to a nuclear carbon atom by a saturated carbon atom, that is, a carbon atom that is bonded by univalent bonds to four other atoms. The saturated carbon atom should have at least one hydrogen atom attached to it. The side chain may comprise only one carbon atom, as the methyl group in toluene, or it may comprise a number of saturated carbon atoms in straight-chain or branched-chain relation, such as the normal butyl radical or the isobutyl radical in normal butylbenzene and in isobutylbenzene, respectively. The substituent need not necessarily be an aliphatic chain; it may be a cycloalkane radical as in tetralin or as in cyclohexylbenzene or an aralkyl group, as a benzyl group, as in diphenylmethane.

Suitable cyclic compounds include toluene, ethylbenzene, n-propylbenzene, isopropylbenzene, and n-butylbenzene, isobutylbenzene, sec. butylbenzene, m-xylene, o-xylene, p-xylene, mesitylene, methyl naphthalene, tetralin, indan, diphenylmethane, cyclopentylbenzene, cyclohexylbenzene, methylcyclohexylbenzene, methylethylbenzene, 1-methyl-1-cyclohexene, 1-ethyl-1-cyclohexene, 1-propyl-1-cyclohexene, 1,2-dimethyl-1-cyclohexene, 1,4-dimethyl - 1 - cyclohexene, 2,3,5 - trimethyl - 1 - cyclohexene, etc. The ring in the compounds herein referred to may contain other substituents, such as a chloro group, a methoxy group, an ethoxy group, a nitro group, and the like.

(2) Although the alkali metal catalysts used previously do not generally permit appreciable reaction of unsubstituted cyclic compounds, the more active catalysts of this invention permit the direct nuclear alkylation of certain unsubstituted cyclic compounds. The second group of suitable compounds containing active hydrogen according to this invention consists of unsubstituted monocyclic or polycyclic, carbocyclic and heterocyclic compounds or aromatic nature. Included in this group are benzene, naphthalene, anthracene and the like, pyridine, furan, thiophene, cyclohexene, etc.

(3) The third group consists of compounds having an olefinic double bond, including acyclic and cyclic olefins.

This group includes ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, etc., 3-methyl-1-butene, 2-methyl-2-butene, 3-methyl-1-pentene, 3-methyl-2-pentene, 4-methyl-1-pentene, 4-methyl-2-pentene, tetramethylethylene and the like. It also includes cycloolefins, such as cyclopentene, cyclohexene, methylcyclopentene, methylcyclohexene and the like.

(4) The fourth group consists of ammonia and primary and secondary aliphatic amines. The unsaturated compound is added to the amine nitrogen.

Suitable amines include, for example, methylamine, dimethylamine, ethylamine, diethylamine, methylethylamine, n-propylamine, isopropylamine, dipropylamine, diisopropylamine, and numerous other mono-and diamine, n-propylamine, isopropylamine, dipropylamine, and dioctadecylamine. These compounds can be classified as compounds of the formula $R_1R_2NH$, where $R_1$ and $R_2$ are selected from the group consisting of hydrogen and aliphatic radicals.

(5) The fifth group consists of phosphine and primary and secondary aliphatic phosphines. The unsaturated compound is added to the phosphorus atom.

Suitable phosphines include, for example, methylphosphine, dimethylphosphine, ethylphosphine, and other analogs of the amines mentioned above. These compounds can be classified as compounds of the formula $R_1R_2PH$, where $R_1$ and $R_2$ are selected from the group consisting of hydrogen and aliphatic radicals.

Reactants of the first class, selected from the above-named groups, can be condensed according to the process of this invention with compounds of the second class, namely unsaturated compounds from one of the following three groups:

(1) The first unsaturated group consists of compounds having a nonconjugated, non-aromatic carbon-to-carbon double bond.

Suitable nonconjugated, olefinically-unsaturated organic compounds are monoolefins such as ethylene, propylene, 1-butene, 2-butene and isobutylene and other monoolefins of higher molecular weight; nonconjugated dienes such as 2,5-dimethyl-1,5-hexadiene and nonconjugated polyolefins containing more than two pairs of double bonds per molecule. Ethylene is particularly preferred in this group. Other preferred compounds in this group are monoolefins in which the alpha carbon atom adjacent the double bond is a quaternary carbon atom, that is, it contains no hydrogen atoms, such as in 3,3-dimethyl-1-butene. Cyclic olefins are also included, e.g., cyclopentene, cyclohexene, methylcyclopentene, methylcyclohexene and the like.

(2) The second unsaturated group consists of compounds containing a nonconjugated carbon-oxygen double bond, in which the carbon which is bonded to oxygen does not also contain a hydrogen atom.

Suitable compounds of this type are ketones such as dimethylketone, methylethylketone and ketones of higher molecular weight, including cyclic ketones such as cyclohexanone and camphor and diketones such as acetylacetone.

(3) The third unsaturated group consists of unsubstituted carbocyclic aromatics and heterocyclic compounds, including benzene, naphthalene, anthracene, pyridine, furan, thiophene, and the like, and their alkyl-substituted derivatives having at least one nuclear hydrogen. The metalated compound of the first class adds to the nucleus of these compounds.

Not all of the possible reactants of the two general classes are equally reactive. Less reactive reactants of one class may not react with less reactive ones of the other class. For example, ethylene is a particularly reactive unsaturated reactant and will react even with benzene when the preferred catalysts of this invention are employed, whereas higher olefins or cyclic compounds may result in little or no reaction with benzene. The order in which the groups in each class are listed above is arbitrary and of no chemical significance.

In general it will not be necessary to employ promoting compounds with the catalyst combinations of this invention. However, promoters useful with the alkali metal catalysts of the prior art can also be employed with the present catalyst combinations. Such promoters are described, for example, in the above-named Pines et al. patents and include fused-ring polycyclic aromatic hydrocarbons, acetylenic hydrocarbons, heterocyclic compounds containing a ring consisting of nitrogen and four to five carbon atoms, alcohols, carboxylic acids, ethers, organic nitrates and cyanides, hydrocarbyl halides, and organic peroxy and azo compounds. When promoters are employed, the reaction is preferably carried out at a lower temperature than in the absense of such promoters.

The condensation reactions are carried out using either batch or continuous types of operation in suitable equipment such as autoclaves or tubular reactors constructed from steel or glass-lined steel reactors. The process is suitably carried out at a temperature of from about 100° to about 350° C., preferably from 125° to 250° C. and most preferably from 175° to 200° C.

The process pressure is at least about 5 atmospheres absolute, and preferably above about 12 atmospheres. Pressures of 250 atmospheres absolute and higher may be employed.

The time of contacting the reactants with the alkali metal catalysts will depend upon a number of variables including the temperature of the reactor, its pressure, the identity of the reactants and the composition of the catalyst. Normally, however, the contact time will be between about 0.05 and 8 hours and preferably between about 0.1 and 1 hour. The time of contacting is taken to mean the time between the moment of initial reaction and the point at which the pressure within the reactor may drop to approximately half of the maximum pressure obtained during reaction. Of course, if the reaction is conducted on a continual basis and the reaction mixture is moved from the reactor to other pieces of equipment following the reactor there may be little or no waiting period following the major period of reaction. However the time of reaction in that case may be taken to be the time of direct contact between the catalyst and the reactants or their products at a temperature where an appreciable reaction is occurring in the presence of the catalyst.

In the aforementioned condensation reactions it is generally preferred to employ at least a stoichiometric amount and still better an excess of the compound of the first class, i.e., those containing an active hydrogen atom, with respect to the unsaturated compound of the second class.

While the several alkali metals may be directly added to an autoclave or reactor as described in the working examples given hereinafter, other methods of preparing the catalysts may be utilized. This is especially desirable when ternary mixtures of alkali metals are being prepared and particularly where extremely small amounts of one of the metals is employed. Under such conditions it is preferred to heat the alkali metals in an inert atmosphere such as argon until they are molten after which they may be poured into a hot inert solvent such as cetane. The solvent may be particularly selected with respect to its specific gravity to obtain an alloy having a particularly desired composition. For example, when sodium potassium alloys are to be modified by very small proportions of lithium, it is preferred to melt the three metals together as described under an argon blanket, the proportion lithium being present at this stage in an amount greater than that desired in the final alloy. When the melt is poured into cetane at an elevated temperature (175–210° C.) and slowly cooled, some of the lithium crystallizes and rises to the surface of the cetane while the lithium-poor portion remains submerged. The lithium which rises to the surface has been found to have a relatively low rate of catalytic action, while the alloy which sinks has been found to be one of the most active of the class of mixtures being described. This alloy preferably containing about 78% potassium and 0.05% lithium is liquid over a wide temperature range.

In carrying out a condensation reaction, the unsaturated compound such as ethylene may be introduced into contact with the compound containing an active hydrogen continuously or intermittently, the later method being commonly employed in the usual type of batch operation conducted in an autoclave. If desired, a relatively inert solvent may be present. After the reaction has reached the desired stage of completion, the reaction products are discharged from the autoclave. Gaseous organic reagents are recovered for further use in the process or utilized for some other purpose. The mixture of reaction products is then subjected to suitable separation treatment such as filtration to remove unconsumed alkali metal catalyst and/or metalated organic compounds. The normally liquid products are fractionated to separate unconverted charging stock from condensation products and higher-boiling material, the latter being sometimes formed as by-products of the reaction. It is often desirable to "kill" the catalyst and decompose any metalated organic compound present by adding a polar compound, such as an alcohol, to the reaction residue.

The drawing illustrates a preferred set of apparatus for conducting the described process on a continuous or semi-continuous basis. Organic compounds to be reacted as described may be sent from storage tank 1 by means of line 21 through pump 2 and line 22 to a mixer 3 wherein it is mixed with catalysts from a storage source 4, the catalyst being sent by means of line 23 through pump 5 and line 24 to the mixer. The mixture of catalyst and feed organic compounds is sent by means of line 25 from the mixer 3 to an optional area 6 which may be called a "pre-treat time tank" which will be described in detail hereinafter. This piece of equipment may be eliminated if desired. From this stage the mixture then travels via line 26 through a booster pump 7 and line 27 to a pipe line reactor 8. This reactor may be conveniently raised to reaction temperature by means of heater 9. After reaction has been completed or at least carried to a desired stage the reaction mixture is transmitted by means of line 28 to a flasher 10 wherein the relatively volatile products of the reaction are passed overhead through line 29 and are cooled in the cooler 11. The cooled product is then conducted by means of line 30 to a separator 12. At this point the gas fraction, constituting the relatively low molecular weight products or unreacted hydrocarbons is separated overhead, the gas fraction may be conducted to an area not shown for further treatment or may be recycled by means of line 31 for re-injection into the system prior to the mixer 3. The liquid fraction constituting the relatively heavier portion of the reaction product is separated from the lower portion of the separator and conducted to an area not shown for further treatment. Heavy ends and catalysts are recovered from the bottom of the flasher 10 and sent by means of line 32 and 33 for recovery of catalysts such as by burning. If desired and possible, some of the catalysts and/or heavy end may be conducted by means of line 34 back into the system prior to the pipe reactor for further use in the process.

The premixing of catalyst and feed and holding of the mixture so formed at a temperature below reaction temperature has been found to result in a more rapid reaction at a lower temperature than if the reaction mixture is raised as quickly as possible to the normal reaction temperature and pressure. The reason for this advantage has not been determined.

In a preferred mode of this invention, one molecular proportion of olefin such as ethylene, and one molecular proportion of alkyl aromatic hydrocarbon such as toluene, are reacted in the presence of one of the specified alkali metal pairs to form a longer chain alkyl aromatic hydrocarbon as illustrated by the following over-all equation:

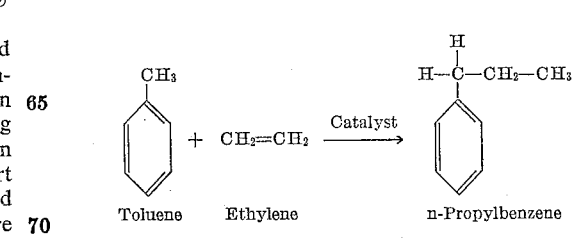

The resultant reaction product such as n-propylbenzene may be reacted with a further molecular proportion of olefin such as ethylene to form a still longer chain alkyl aromatic hydrocarbon as indicated by the following overall equation:

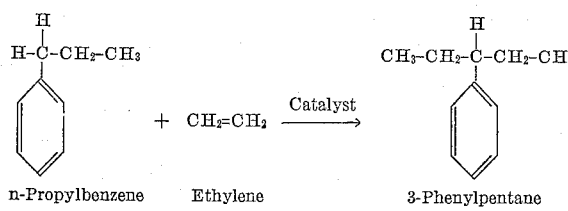

n-Propylbenzene    Ethylene    3-Phenylpentane

Other alkyl aromatic hydrocarbons and cycloalkyl-aromatic hydrocarbons may be reacted similarly with ethylene to produce longer chain alkyl aromatic hydrocarbons from one molecular proportion of the charged alkyl aromatic hydrocarbon and one, two or more molecular proportions of the olefin.

In the above reaction, the alkyl aromatic reagent forms an unstable metalated compound by reaction with the catalyst. The reaction mechanism is considered to be as follows:

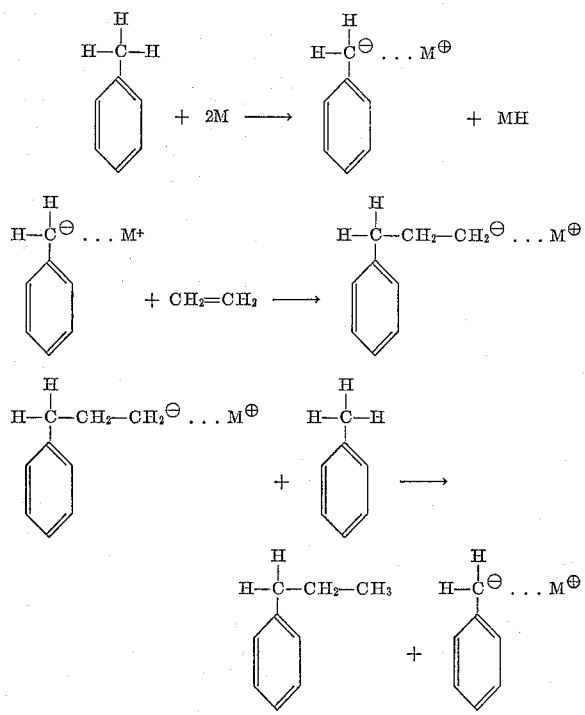

In the above series, M is a metal atom from the active metal pairs. The above series of reactions does not take place directly, or only with extreme difficulty, with the less active catalysts of the prior art, in the absence of promoters of the type which are readily metalated. With the active catalysts of this invention, the reactions proceed readily without extraneous promoters.

The nature of the invention is further illustrated by the following examples which, however, should not be construed to limit the scope of the invention.

EXAMPLE I

Run No. 1 was carried out as follows: A stainless steel autoclave equipped with a magnetic plunger and having 250 cc. capacity was charged with 92.0 grams of toluene and 4.0 grams of potassium. The autoclave was then closed and ethylene was introduced into the autoclave to an initial pressure of 30.5 atmospheres. This was the amount of ethylene calculated to be one mole per mole of toluene present. The magnetically operated plunger of the autoclave was then started and the autoclave put in a furnace and heated as rapidly as possible to 200° C. The autoclave was equipped to permit continuous measuring of the pressure therein and a record of the pressure was made.

From the initial pressure of 30.5 atmospheres, the pressure rose as the autoclave was heated until, at a temperature of 200° C. and after an elapsed time of 30 minutes, the pressure was about 74 atmospheres. Heating was discontinued but the pressure continued to rise further and reached a peak of 86.5 atmospheres after an elapsed time of about 60 minutes. The pressure then began to drop, indicating completion of the reaction. The drop was rapid after 80 minutes had elapsed.

The autoclave was permitted to cool to room temperature. The gas was then vented to a gas collector for analysis and the liquid contents were recovered and separately analyzed. The solid material remaining in the bomb was treated with isopropyl alcohol and additional residual material recovered in isopropyl alcohol solution. This material was also analyzed. The reaction conditions and recovered products are shown in Table 1.

Table 1

| Run No. | 1 | 2 | 3 | 4 |
|---|---|---|---|---|
| Catalyst | K | Cs | Li | Na |
| Percent mole, basis toluene | 10.0 | 0.7 | 10.0 | 10.0 |
| Percent weight, basis toluene | 4.4 | 1.1 | 0.8 | 2.5 |
| Toluene: | | | | |
| Grams | 92.0 | 92.0 | 92.0 | 92.0 |
| Moles | 1.0 | 1.0 | 1.0 | 1.0 |
| Ethylene: | | | | |
| Grams | 28.0 | 29.0 | 28.0 | 28.0 |
| Moles | 1.0 | 1.03 | 1.0 | 1.0 |
| Temperature, ° C. | 200 | 200 | 200 | 200 |
| Reaction time,[1] minutes | 120 | 65 | 240 | 240 |
| Maximum pressure, atmospheres, gauge | 87 | 79 | 92 | 88 |
| Toluene reacted, mole percent | 67.1 | 63.2 | 3.1 | 0.4 |
| Ethylene reacted, mole percent | 100.0 | 96.0 | 13.0 | 8.0 |
| Ethylene converted to alkylate, mole percent | 93.0 | 77.8 | 0.1 | 0.5 |
| Yield, mole percent (basis ethylene): | | | | |
| n-Propylbenzene | 37.0 | 35.2 | 0.1 | 0.5 |
| 3-phenylpentane | 28.0 | 19.1 | 0 | Tr. |

[1] From 200° C. until pressure dropped to 20 atmospheres.

In this and numerous similar experiments it was found that the condensation reaction generally commenced at a temperature of 200° C. or somewhat below 200° C. and resulted in a temperature rise in the autoclave. In each case the heating was discontinued after reaction had commenced and the degree to which the reaction proceeded was then found by observing the pressure in the autoclave as well as by subsequent analysis of the products.

For convenience of comparison the reaction time is considered to be that period of time between the moment at which the autoclave reaches a temperature of 200° and that at which the pressure in the autoclave drops to 20 atmospheres.

In the experiments shown in Table 1, run No. 1 was carried out with potassium, run No. 2 with cesium, run No. 3 with lithium and run No. 4 with sodium as the catalytic alkali metal. The time required for completion of reaction in runs Nos. 1 and 2 was from 1 to 2 hours while runs Nos. 3 and 4 showed very little reaction even in a 4-hour contact period.

EXAMPLE II

Runs Nos. 5 through 10 were carried out in essentially the same manner as runs Nos. 1 to 4 of Example I but in each case the catalyst employed was a mixture of two different alkali metals. Since the alkali metals are liquid at reaction conditions, no special effort was made to prepare the mixture of metals separately. Rather, the autoclave was filled at the beginning of each run with measured amounts of the aromatic hydrocarbon and of each of the required alkali metals. The proportions of metals as well as other reaction conditions and results are shown in Table 2.

Table II

| Run No. | 5 | | 6 | | 7 | | 8 | | 9 | | 10 | |
|---|---|---|---|---|---|---|---|---|---|---|---|---|
| Catalyst | Li | Na | Na | K | Li | Cs | Li | K | K | Cs | K | Cs |
| Percent mole, basis toluene | 0.7 | 4.0 | 3.0 | 8.0 | 4.0 | 0.7 | 0.7 | 4.0 | 4.0 | 0.7 | 4.0 | 0.04 |
| Percent weight, basis toluene | 0.05 | 1.1 | 0.9 | 3.5 | 1.1 | 1.1 | 0.05 | 1.9 | 1.9 | 1.1 | 1.9 | 0.06 |
| Mole Ratio | Li:Na=0.18:1 | | Na:K=0.45:1 | | Li:Cs=5.7:1 | | Li:K=0.18:1 | | K:Cs=5.7:1 | | K:Cs=100:1 | |
| Toluene: | | | | | | | | | | | | |
| Grams | 92 | | 92 | | 92 | | 92 | | 92 | | 92 | |
| Moles | 1.0 | | 1.0 | | 1.0 | | 1.0 | | 1.0 | | 1.0 | |
| Ethylene: | | | | | | | | | | | | |
| Grams | 29 | | 28 | | 29 | | 28 | | 29 | | 29 | |
| Moles | 1.03 | | 1.0 | | 1.03 | | 1.0 | | 1.03 | | 1.03 | |
| Temperature, °C | 200 | | 200 | | 200 | | 200 | | 200 | | 200 | |
| Reaction time,[1] minutes | 240 | | 80 | | 10 | | 10 | | 5 | | 10 | |
| Maximum pressure, atmospheres gauge | 92 | | 82 | | 76 | | 83 | | 73 | | 79 | |
| Toluene reacted, mole percent | 0 | | 66.9 | | 53.9 | | 68.5 | | 74.4 | | 72.4 | |
| Ethylene Converted to Alkylate, mole percent | 0 | | 82.6 | | 62.7 | | 86.3 | | 100 | | 98.6 | |
| Yield, mole percent (basis ethylene): | | | | | | | | | | | | |
| n-Propylbenzene | 0 | | 34.4 | | 34.1 | | 38.7 | | 44.0 | | 48.4 | |
| 3-phenylpentane | 0 | | 24.1 | | 13.5 | | 23.8 | | 24.0 | | 25.1 | |

[1] From 200° C until pressure dropped to 20 atmospheres.

It is seen that a mixture of lithium and sodium was no more active than either of the metals alone, in that there was no substantial reaction during the period of 4 hours. The mixture of sodium and potassium was somewhat more active than potassium alone, but less reactive than cesium alone.

Runs Nos. 7 to 10 are carried out with combinations of alkali metals according to the invention. These mixtures were so much more reactive than any of the alkali metals alone or any of the other mixtures tested that the reaction in each was was completed in a period of 5 to 10 minutes.

EXAMPLE III

An experiment was carried out in a manner similar to that of run No. 10 of Example II, but employing as the hydrocarbons alphamethylstyrene and ethylene. Beneze was added to the reaction mixture to serve as diluent. The autoclave was heated to 200° C. From the variation in pressure it was observed that the reaction of the hydrocarbons, resulting in substantially complete consumption of the ethylene, was completed in a period of less than 5 minutes from the time of initiation of the reaction.

EXAMPLE IV

When the alkylation of toluene with ethylene is carried out with catalyst combination as in runs Nos. 7–10 of Example II but at temperatures of 100° to 150° C. and with the addition of 15 mole percent or less, based on the weight of alkali metal, of a reaction promoter such as anthracene, fluorene, 1-heptine, 2-methylpyridine, m-cresol, o-toluic acid, allyl chloride, sec. butyl chloride, or any other suitable promoter, the reaction is completed in an equally short time with at least equally good toluene conversions.

EXAMPLE V

One mole of toluene is reacted with 1 mole of propylene in the presence of 3 grams of potassium and 1 gram of lithium at 200° C. During a 4-hour reaction period, the maximum pressure reached is about 700 p.s.i.

The reaction product, on the basis of propylene converted, contains 35 mole percent isobutylbenzene and 1.3 mole percent n-butlybenzene.

When 1-methyl-1-cyclohexene is substituted for toluene a substantial conversion to 1-isobutyl-1-cyclohexene is obtained.

EXAMPLE VI

One gram mole of aniline is reacted with 1 gram mole of ethylene in the presence of 3 grams of potassium and 1 gram of cesium, at 200° C. The principal reaction product is N-ethylaniline.

EXAMPLE VII

In a run in which 82 parts of cyclohexene and 8 parts of sodium are heated for 17 hours at 900–1000 atmospheres pressure of ethylene at 225° C., ethylene being added to maintain the pressure, the reaction product contains about 19 parts of ethylcyclohexenes.

When the same reactants are contacted in the presence of 8 parts of sodium and 8 parts of cesium, the same reaction takes place more readily at a substantially lower pressure.

EXAMPLE VIII

One gram mole of toluene and one gram mole of benzalacetophenone

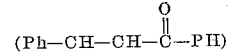

(Ph—CH—CH—C—Ph)

are employed as reactants in the presence of 10 mole percent of potassium, basis toluene, plus 2.5 mole percent of lithium. The reaction mixture is maintained at 100°–200° C. for 2 hours. The principal reaction product is

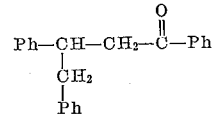

Ph—CH—CH₂—C—Ph
    |
    CH₂
    |
    Ph

EXAMPLE IX

A series of experiments (runs Nos. 11–14) was carried out in which propylene was the sole hydrocarbon reactant. One gram mole of benzene was placed in an autoclave to provide a liquid phase, and catalyst was also placed in the autoclave. Propylene was then gradually added in the same manner as ethylene had been added in run No. 1. Reaction conditions and results are set out in Table 3. Runs Nos. 11–13 were made with novel catalysts of this invention. One-fourth to one-third of the propylene charged was converted. Of the converted portion, over 50% was converted to $C_6$ olefins. The $C_6$ olefin fraction contained from 56 to 76% 4-methyl-1-pentene.

In a comparison experiment, run No. 14, propylene was converted by use of an anthracene-promoted sodium catalyst at otherwise identical conditions. Only 20 mole percent of the propylene was converted; the dimer fraction consisted of the following: 45% 4-methyl-2-pentene; 32% 2-methyl-2-pentene; 16% 4-methyl-1-pentene and 7% 2-methyl pentene.

Table 3

| Run No | 11 | 12 | | 13 | | 14 |
|---|---|---|---|---|---|---|
| Catalyst | K | Li | Cs | Li | K | Na |
| Weight, grams | 1.1  1.8 | 1.0 | 2.1 | 1.0 | 1.0 | 1.5 |
| Mole ratio | K:Cs=2.08 | Li:Cs=0.91 | | Li:K=0.56 | | |
| Promoter (anthracene), weight, grams | 1.7 | | | | | 1.8 |
| Propylene, moles | 0.83 | 1.52 | | 1.49 | | 1.54 |
| Temperature, °C | 200 | 200 | | 200 | | 200 |
| Reaction time, hours | 4 | 5 | | 4 | | 4 |
| Maximum pressure, atmospheres gauge | 54 | 129 | | 132 | | 156 |
| Propylene reacted, mole percent | 33 | 26 | | 31 | | 20 |
| Yield, mole percent (basis propylene converted): | | | | | | |
| Propane | 21 | 13 | | 17 | | 10 |
| $C_6$ olefins | | 53 | | 51 | | 57 |
| Composition of $C_6$ olefins: | | | | | | |
| 4-methyl-1-pentene | 68 | 56 | | 76 | | 16 |
| 4-methyl-2-pentene | | | | | | 45 |
| 2-methyl-2-pentene | | | | | | 32 |
| 2-methyl-1-pentene | | | | | | 7 |

By comparing these data, it is seen that the catalysts of this invention are not only substantially more active in promoting the dimerization of propylene, but effect an entirely different product distribution in that 4-methyl-1-pentene, which was present only in a small amount in the product made with a conventional catalyst is now the major product of the reaction.

EXAMPLE X

In an experiment carried out in a manner similar to Example IX, a mixture of 0.59 mole ethylene and 0.47 mole propylene was charged to an autoclave containing 84 grams benzene solvent, 1.0 gram potassium and 3.5 grams lithium. The temperature varied between 150° and 180° C. The maximum pressure was 54 atmospheres. The time was 75 minutes. 78.4 mole percent of the ethylene and 91.4 mole percent of the propylene were converted; the mole ratio of ethylene to propylene converted was 1.06. On a basis of 100 moles propylene reacted, the product contained 8.6 moles ethane, 1.3 moles propane, 42.3 moles pentene-1, 11.0 moles pentene-2 and a trace of n-pentane. Of the $C_5$ product, 79.7% was pentene-1.

EXAMPLE XI

In an experiment carried out in a manner similar to Example IX, ethylene was charged to an autoclave containing n-heptane and an alkali metal catalyst, at a temperature of 200° C. One run, No. 15, was made with a conventional potassium catalyst and another, No. 16, with catalyst consisting of 0.03 mole potassium and 0.14 mole lithium.

The degree of reaction is evidenced by the change in pressure in the autoclave, as shown in Table 4.

Table 4

| Run No | 15 | 16 |
|---|---|---|
| Catalyst | K | K-Li |
| Time from start, hours | Pressure, atmospheres gauge | |
| 0 | 149 | 108 |
| ¼ | | 129 |
| 1 | | 41 |
| 2 | 169 | 33 |
| 4 | 142 | |
| 8 | 109 | |
| 16 | 33 | |

The product, in each run, consisted of light hydrocarbon oil. No solid polymer was produced.

EXAMPLE XII 2-butene and ethylene were copolymerized over a mixture of lithium and potassium under two different sets of catalyst preparation. In test A the two metals were simply added to the autoclave as chunks of each of the pure metals; while in test B an alloy of the two metals was preformed by melting the two metals together prior to addition to the autoclave. The test conditions and the results obtained are given in Table 5 which follows. It will be seen that there is little choice between the two alternative means of combining the mixed catalysts.

Table 5

| Run No | A | | B | |
|---|---|---|---|---|
| Feed: | | | | |
| 2-butene, g. (mol) | 56.5/(1.01) | | 57.5/(1.02) | |
| Ethylene, g. (mol) | 30.5/(1.09) | | 27.0/(0.96) | |
| Total, g | 87.0 | | 84.5 | |
| $C_2/C_4$ mole ratio | 1.08 | | 0.94 | |
| Solvent, n-heptane, g | 13.5 | | 13.1 | |
| Catalyst, g./(m.): | | | | |
| Lithium | 0.2/(0.028) | | 0.03/(0.004) | |
| Sodium | | | | |
| Potassium | 1.1/(0.029) | | 1.17/(0.030) | |
| Physical state of catalyst | Chunks of each pure metal. | | Chunks of preformed alloy. | |
| Run conditions: | | | | |
| Reaction temp, °C ±5 | 260 (max) to 200 | | 200 | |
| Max. pressure, p.s.i.g. ±20 | 2,100 at 250° | | 1,680 at 186° | |
| Time to ½ max. pressure hr | 0.3 | | 0.8 | |
| Total run time, hour | 0.4 | | 1.2 | |
| Conditions of preheat | None | | None | |
| Conversion, percent of— | | | | |
| 2-butene | 59.4 | | 70.1 | |
| Ethylene | 64.3 | | 87.4 | |
| Selectivity [1] of | 2-butene | Ethylene | 2-butene | Ethylene |
| To: | | | | |
| n-butane (or ethane) | 1.2 | Trace | 0.1 | 2.4 |
| 3-methyl-1-pentene | 58.4 | 50.0 | 54.4 | 46.5 |
| 3-methyl-2-pentenes | 7.5 | 6.4 | 11.5 | 9.8 |
| n-Hexenes | 18.6 | 15.9 | 25.1 | 21.5 |
| $C_8$ cpds. (unidentified, assumed $C_4+2C_2$) | | | | |
| $C_{10}$+cpds. as $C_4+4C_2$ | 2.4 | 8.1 | | |
| Residue | 1.8 | 6.2 | 0.3 | 1.1 |
| (Total) | (98.3) | (101.0) | (100.9) | (97.5) |

[1] In moles per 100 moles of 2-butene or ethylene converted.

Ethylene and 2-butene were copolymerized using ternary alloys as catalysts under several different sets of operating conditions which are described together with the products obtained in Table 6 which follows. According to Example C of Table 6, the reaction mixture comprising the several olefins and catalysts were preheated prior to raising the temperature to a reaction temperature. The conditions are given in Table 6. Essentially the same conditions were employed insofar as the catalyst and reaction conditions are concerned in Example D of the same table except that no pre-treatment of the reaction mixture was employed. It is noteworthy that it was necessary to raise the temperature to about 25° higher than in the case of Example C for reaction to occur and that a substantially longer reaction time was necessary in order to complete the reaction.

Table 6

| Run No | C | D |
|---|---|---|
| Feed: | | |
| 2-butene, g./(m.) | 56.5/(1.01) | 57.0/(1.02) |
| Ethylene, g./(m.) | 29.5/(1.05) | 28.5/(1.02) |
| Total, g | 86.0 | 85.5 |
| $C_2/C_4$ mole ratio | 1.04 | 1.00 |
| Solvent, n-heptane, g | 13.0 | 13.0 |
| Catalyst, g./(m.): | | |
| Lithium | 0.2/(0.028) | 0.2/(0.029) |
| Sodium | 0.22/(0.010) | 0.22/(0.010) |
| Potassium | 0.78/(0.020) | 0.78/(0.020) |
| Physical state of catalyst | Solid Li, plus liquid eutectic NaK. | Solid Li, plus liquid eutectic NaK. |
| Run conditions: | | |
| Reaction temp, °C ±5 | 175 | 200 |
| Max. press., p.s.i.g. ±20 | 1,580 at 165° | 2,220 |
| Time to ½ max. press., hr | 0.1 | 1.1 |
| Total run time, hr | 4.1 | 1.6 |
| Conditions of preheat | 1 hr at 25°; 1 hr from 25–100°; ½ hr at 100°. | None |

Table 6—Continued

| Run No. | C | | D | |
|---|---|---|---|---|
| Conversion, percent of— | | | | |
| 2-butene | 83.8 | | 61.1 | |
| Ethylene | 91.4 | | 50.6 | |
| Selectivity [1] of | 2-butene | Ethylene | 2-butene | Ethylene |
| To: | | | | |
| n-butane (or ethane) | 0.6 | 4.0 | Trace | 5.9 |
| 3-methyl-1-pentene | 55.2 | 48.4 | 38.0 | 45.5 |
| 3-methyl-2-pentenes | 11.2 | 9.9 | 3.4 | 4.1 |
| n-hexenes | 17.4 | 15.2 | 26.6 | 32.1 |
| $C_8$ cpds. (unidentified, assumed $C_4+2C_2$) | 10.9 | 19.2 | 7.9 | 19.0 |
| $C_{10}$+cpds. as $C_4+4C_2$ | 1.4 | 5.2 | | |
| Residue | 0.2 | 0.5 | 2.5 | 12.1 |
| (Total) | (96.9) | (102.4) | (78.4) | (119.0) |

[1] In moles per 100 moles of 2-butene or ethylene converted.

EXAMPLE XIII

Propylene and ethylene were condensed to form 3-ethyl-1-pentene using a ternary catalyst containing only 0.05% by weight of lithium. The conditions employed and the results obtained are listed in Table 7.

Table 7

PREPARATION OF 3-ETHYL-1-PENTENE

Feed:
- Propylene, g _____ 15.0
- Ethylene, g _____ 43.5

Catalyst:
- Li, g _____ 0.0006
- Na, g _____ 0.28
- K, g _____ 0.92

Solvent:
- Cetane, g _____ 17

Process conditions:
- Temperature, °C _____ 200
- Maximum pressure, p.s.i.g. at 20° C _____ 2290
- Time to ½ maximum pressure, hour _____ 2.4

Conversion:
- Propylene, percent _____ 97.1
- Ethylene, percent _____ 69.6

Selectivity of propylene to [1]:
- Pentenes, percent _____ 12.1
- 3-ethyl-1-pentene _____ 47.8

[1] In moles per 100 moles of propylene converted.

This application is a continuation in part of patent application Serial No. 745,310, filed June 30, 1958, now abandoned, which in turn was a continuation in part of patent application Serial No. 714,061, filed February 10, 1958, now abandoned.

We claim as our invention:

1. A process for producing n-propylbenzenes and 3-phenylpentane which comprises condensing ethylene and toluene at a condensation temperature of from about 100° to about 350° C. and at a condensation pressure of from about 5 to about 250 atmospheres in the presence of a catalyst selected from the group consisting of the alkali metal pairs potassium and cesium, lithium and cesium, and lithium and potassium.

2. A process for producing 4-methyl-1-pentene which comprises condensing propylene in the presence of an inert organic solvent at a temperature of from about 100° to about 350° C. and at a pressure of from about 5 to about 250 atmospheres in the presence of a catalytic amount of a mixture containing at least two alkali metals from non-successive periods of the periodic table.

3. A process according to claim 2 in which said catalyst is selected from the group consisting of the alkali metal pairs potassium and cesium, lithium and cesium, and lithium and potassium.

4. A process for producing a condensation product from a first reactant of the group consisting of alkylaromatic hydrocarbons wherein a hydrogen atom is attached to an alkyl carbon which in turn is attached to an aromatic carbon and a second reactant of the group consisting of alkenes and non-conjugated alkadienes, wherein the product molecules contain all of the carbon and hydrogen atoms of both reactants, which comprises heating the reactants in a temperature range from about 100° C. to about 350° C. and at a pressure from about 5 to about 250 atmospheres in the presence of from about 0.01 to about 0.2 mol of a mixed alkali metal catalyst per mol of the first reactant, the catalyst comprising essentially two alkali metals from non-successive periods of the periodic table, one of said metals being present in 0.02–99 mol percent relative to the second alkali metal.

5. A process according to claim 4 wherein the first reactant is an alkyl benzene wherein the alkyl radical has 1–4 carbon atoms and the second reactant is an alkene having 2–6 carbon atoms per molecule.

6. A process according to claim 4 wherein said first-named compound and said second-named compound are olefins.

7. A process for producing a condensation product from a first reactant of the group consisting of alkylaromatic hydrocarbons wherein a hydrogen atom is attached to an alkyl carbon which in turn is attached to an aromatic carbon and a second reactant of the group consisting of alkenes and non-conjugated alkadienes, wherein the product molecules contain all of the carbon and hydrogen atoms of both reactants, which comprises heating the reactants in a temperature range from about 100° C. to about 350° C. and at a pressure from about 5 to about 250 atmospheres in the presence of from about 0.01 to about 0.2 mol of a mixed alkali metal catalyst per mol of the first reactant, the catalyst comprising essentially two alkali metals from non-successive periods of the periodic table, one of said metals being present in 1–99 mol percent relative to the second metal, and at least a third alkali metal.

8. A process according to claim 7 wherein the third alkali metal is lithium.

9. A process for producing a condensation product from a first reactant of the group consisting of alkylaromatic hydrocarbons wherein a hydrogen atom is attached to an alkyl carbon which in turn is attached to an aromatic carbon and a second reactant of the group consisting of alkenes and non-conjugated alkadienes, wherein the product molecules contain all of the carbon and hydrogen atoms of both reactants, which comprises heating the reactants in a temperature range from about 100° C. to about 350° C. and at a pressure from about 5 to about 250 atmospheres in the presence of from about 0.01 to about 0.2 mol of a mixed alkali metal catalyst per mol of the first reactant, the catalyst comprising essentially two alkali metals from non-successive periods of the periodic table, one of said metals being present in 0.02–99 mol percent relative to the second alkali metal.

10. A process for the production of olefins having 5–7 carbon atoms per molecule comprising contacting a mixture of ethylene and at least one olefin having 3–5 or more carbon atoms per molecule with 0.01–0.2 mol of an alkali metal catalyst per mol of total ethylene and olefin at a temperature of 150–325° C. and pressure of 7.5–150 atmospheres for 0.05–8 hours said catalyst comprising essentially sodium, potassium and lithium, the sodium being present in a proportion between 15 and 75 mol percent and the lithium being present in an amount between about 0.02–0.1%.

11. A process according to claim 8 wherein lithium is present in the catalyst mixture in an amount between about 0.02 and 0.1 mol percent.

12. A process for producing a condensation product in which a hydrocarbon selected from the group consisting of alkyl aromatic hydrocarbons wherein a hydrogen atom is attached to an alkyl carbon which in turn is attached to an aromatic carbon and olefins and containing an active hydrogen atom combines with an olefinically unsaturated hydrocarbon, which comprises contacting a reactant mixture containing both types of hydrocarbons aforesaid at a temperature within the range of from about 100° C. to about 350° C. in the presence of from about 0.01 to about 0.2 mol of a mixed alkali metal catalyst per mol of the first reactant, the catalyst comprising essentially two alkali metals from non-successive periods of the periodic table, one of said metals being present in 0.02–99 mol percent relative to the second alkali metal.

References Cited in the file of this patent
UNITED STATES PATENTS
2,449,641    Whitman _____ Sept. 7, 1948